United States Patent
Tear

(10) Patent No.: US 10,226,138 B2
(45) Date of Patent: Mar. 12, 2019

(54) HOOK FOR PEGBOARD

(71) Applicant: Paul Tear, Magog (CA)

(72) Inventor: Paul Tear, Magog (CA)

( * ) Notice: Subject to any disclaimer, the term of this patent is extended or adjusted under 35 U.S.C. 154(b) by 0 days.

(21) Appl. No.: 15/928,096

(22) Filed: Mar. 22, 2018

(65) Prior Publication Data

US 2018/0310729 A1 Nov. 1, 2018

Related U.S. Application Data

(60) Provisional application No. 62/602,500, filed on Apr. 26, 2017.

(51) Int. Cl.
*A47F 5/00* (2006.01)
*A47F 5/08* (2006.01)
*F16B 9/02* (2006.01)
*F16B 2/00* (2006.01)
*F16B 2/22* (2006.01)

(52) U.S. Cl.
CPC .......... *A47F 5/0823* (2013.01); *A47F 5/0006* (2013.01); *F16B 9/023* (2013.01); *F16B 2/005* (2013.01); *F16B 2/22* (2013.01)

(58) Field of Classification Search
CPC ...... A47F 5/0823; A47F 5/0006; F16B 9/023; F16B 2/005; F16B 2/22; A47B 96/061
USPC ........................................ 248/220.43, 220.41
See application file for complete search history.

(56) References Cited

U.S. PATENT DOCUMENTS

| | | | |
|---|---|---|---|
| 2,312,985 A * | 3/1943 | Bales | A47F 5/0823 248/220.43 |
| 2,498,623 A | 2/1950 | Poupitch | |
| 2,790,616 A | 4/1957 | Cardinal, Jr. | |
| 2,841,353 A | 7/1958 | Burdick | |
| 2,859,008 A * | 11/1958 | Zimmer | A47F 5/0823 248/220.43 |
| 2,872,145 A | 2/1959 | Goldsholl | |
| 2,961,724 A * | 11/1960 | Alling | F16B 2/24 248/220.43 |
| 3,037,732 A | 6/1962 | Roman | |
| 3,037,733 A * | 6/1962 | Roman | A47F 5/0823 248/220.43 |
| 3,091,423 A | 5/1963 | Butterworth | |
| 3,163,392 A * | 12/1964 | Husted | A47F 5/0823 211/96 |
| 3,193,225 A * | 7/1965 | Terlinde | A47F 5/0823 108/10 |
| 3,227,412 A * | 1/1966 | Terlinde | A47F 5/0823 248/220.43 |
| 3,241,799 A * | 3/1966 | Terlinde | A47F 5/0823 248/220.43 |
| 3,289,991 A | 12/1966 | Kalahar | |
| 3,319,917 A * | 5/1967 | Bilodeau | A47F 5/0823 248/220.43 |
| 3,606,225 A | 9/1971 | Rasmussen | |
| 3,625,464 A | 12/1971 | Conran | |

(Continued)

*Primary Examiner* — Patrick D Hawn

(57) ABSTRACT

An improved hook for use with a pegboard is provided. The improved hook has a vertical central body, an L-shaped upper anchor, a U-shaped lower anchor, and a horizontal rod for hanging tools and objects. The L-shaped upper anchor and U-shaped lower anchor are configured to secure the hook on the pegboard such that the hook does not get accidently dislodged from the pegboard. A lever on the U-shaped lower anchor is provided to release the anchor and hook from the pegboard.

6 Claims, 3 Drawing Sheets

(56) References Cited

U.S. PATENT DOCUMENTS

| | | | | |
|---|---|---|---|---|
| 3,891,172 A | * | 6/1975 | Einhorn | A47F 5/0823 248/220.43 |
| 4,405,110 A | * | 9/1983 | Gibbons | A47F 5/0823 248/220.22 |
| 4,441,680 A | | 4/1984 | Rivkin et al. | |
| 4,506,856 A | * | 3/1985 | Rich | A47F 5/0823 248/220.31 |
| 4,619,428 A | * | 10/1986 | Bailey | A47F 5/0823 248/220.43 |
| 4,917,337 A | | 4/1990 | Gridley | |
| 4,928,912 A | * | 5/1990 | Florek | A47F 5/0823 248/220.43 |
| 5,137,239 A | | 8/1992 | Horton | |
| 5,165,640 A | * | 11/1992 | Williams, 3rd | A47F 5/0823 248/220.43 |
| D332,047 S | | 12/1992 | Kluk et al. | |
| 5,346,167 A | * | 9/1994 | Smialek | A47F 5/0823 248/220.43 |
| D352,653 S | | 11/1994 | Keddie | |
| D354,675 S | | 1/1995 | Bannister | |
| D355,112 S | | 2/1995 | Richeson | |
| 5,397,087 A | * | 3/1995 | Teece | A47B 57/425 211/106 |
| D378,050 S | | 2/1997 | Richeson | |
| 5,855,347 A | * | 1/1999 | Hollingsworth | A47B 96/061 211/59.1 |
| 6,186,455 B1 | * | 2/2001 | Hollingsworth | A47B 96/061 211/59.1 |
| D755,616 S | | 5/2016 | Fleck | |
| 9,486,913 B2 | * | 11/2016 | Thieman | A47F 5/0823 |

* cited by examiner

HOOK FOR PEGBOARD

CROSS-REFERENCE TO RELATED APPLICATIONS

The present application claims priority to U.S. Provisional Application Ser. No. 62/602,500, filed on Apr. 26, 2017 entitled "Hook for pegboard with push and U lock anchor system", the disclosure of which is hereby incorporated in its entirety at least by reference.

BACKGROUND OF THE INVENTION

1. Field of the Invention

The present invention relates generally to a hook but more particularly to an improved hook for use with a pegboard.

2. Description of Related Art

The use of hooks in pegboards is well known. Existing hooks of the prior art are made from metal rods, and the hooks allow tools and other objects to be stored on a flat surface, such as wall. However, the hooks of the prior art have several disadvantages. Due to their shape and connection with holes of a pegboard, the hooks are easily dislodged from the holes when accidentally bumped into. Specifically, any upward motion on a hook will dislodge it from a pegboard. Further, when a user attempts to retrieve a hanging object or tool from a hook on a pegboard, the act of retrieving the object often dislodges the hook from the pegboard, frustrating the user, and even causing damage to the object or hook, and possibly injury to the user. Consequently, an improved hook for use with a pegboard is needed.

BRIEF SUMMARY OF THE INVENTION

In one embodiment of the present invention a hook for use with a pegboard is provided, comprising a vertical central body having a flat back side, a front side, an upper portion, central portion, and a lower portion; a L-shaped upper anchor configured to be inserted into a first hole of the pegboard, wherein the L-shaped upper anchor is attached to the upper portion of the vertical central body; a U-shaped lower anchor configured to be inserted into a second hole of the pegboard, wherein the U-shaped lower anchor is attached to the lower portion of the vertical central body; and, a horizontal rod for hanging objects, wherein the horizontal rod is attached to the front side of vertical central body approximate to the central portion.

In one embodiment, the flat back side is configured to be flush with the pegboard during use. In one embodiment, a reinforcement rib positioned between a lower side of the horizontal rod and the front side of the vertical central body is provided for support. In another embodiment, a wing attached to each side of the vertical central body approximate to the central portion is provided. In one embodiment, the horizontal rod includes a raised end configured to help secure a hanged object on the horizontal rod. In one embodiment, the L-shaped upper anchor consists essentially of a horizontal member, a vertical member, and a notch, wherein the notch is configured to accommodate varying pegboard thicknesses. In one embodiment, the U-shaped lower anchor comprises a rigid member, a flexible member, a plurality of teeth, and a lever. In yet another embodiment, a tooth of the plurality of teeth is configured to cling to an edge of the second hole of the pegboard. In one embodiment, the lever is configured to disengage the tooth of the plurality of teeth from the second hole of the pegboard allowing the removal of the hook

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide an improved hook for use with a pegboard.

Figure 1:
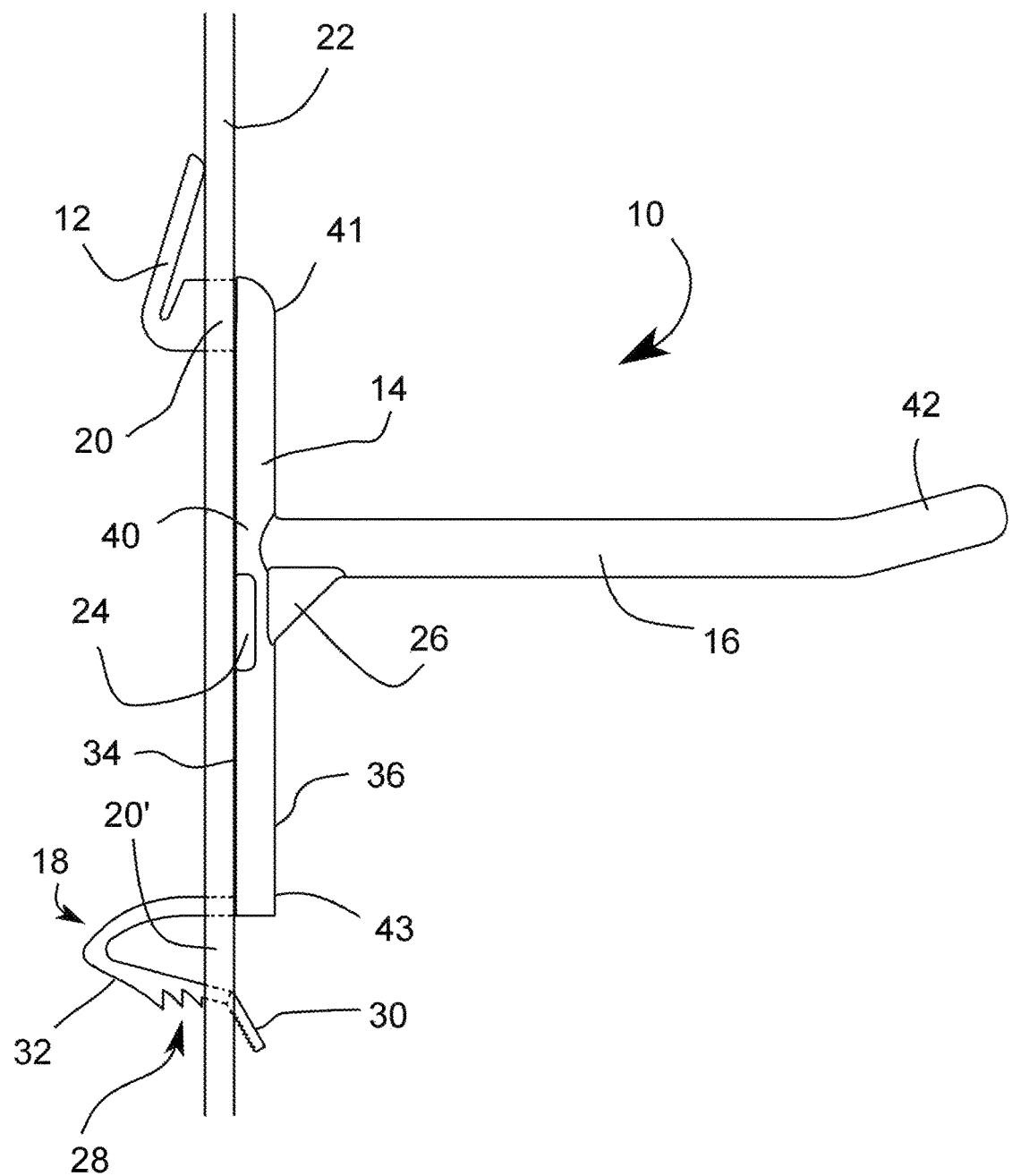
FIG. 1 is a side view of an improved hook for use with a pegboard according to an embodiment of the present invention.

FIG. 1 is a side view of an improved hook 10 for use with a pegboard 22 according to an embodiment of the present invention. Referring now to FIG. 1, the hook comprises an upper anchor 12, a vertical central body 14, and a lower anchor 18. The hook further comprises a horizontal rod 16 configured to hang tools and objects as well known in the art. In one embodiment, the horizontal rod includes a raised end 42 to help retain the tools and objects on the horizontal rod. In one embodiment, the horizontal rod is cylindrical, however it is understood that other shapes may be used. In one embodiment, the hook occupies three vertically aligned holes on the pegboard, utilizing the first and third hole. Specifically, the hook secures to the pegboard utilizing holes 20 and 20' and the upper and lower anchor respectively. The upper and lower anchor will be described in greater detail below.

In one embodiment, the vertical central body has a flat back side 34 configured to be flush against the pegboard during use. In one embodiment, the vertical central body has a rounded front side 36 that is configured to accept the horizontal rod approximate to a central portion 40 of the vertical central body. A reinforcement rib 26 is provided between a lower side 36 of the horizontal rod and the front side of the vertical central body for support. Similarly, a wing 24 is provided on each side of the vertical central body approximate to the central portion providing stability against the pegboard during use by increasing the lateral surface area touching the pegboard.

Figure 2A:
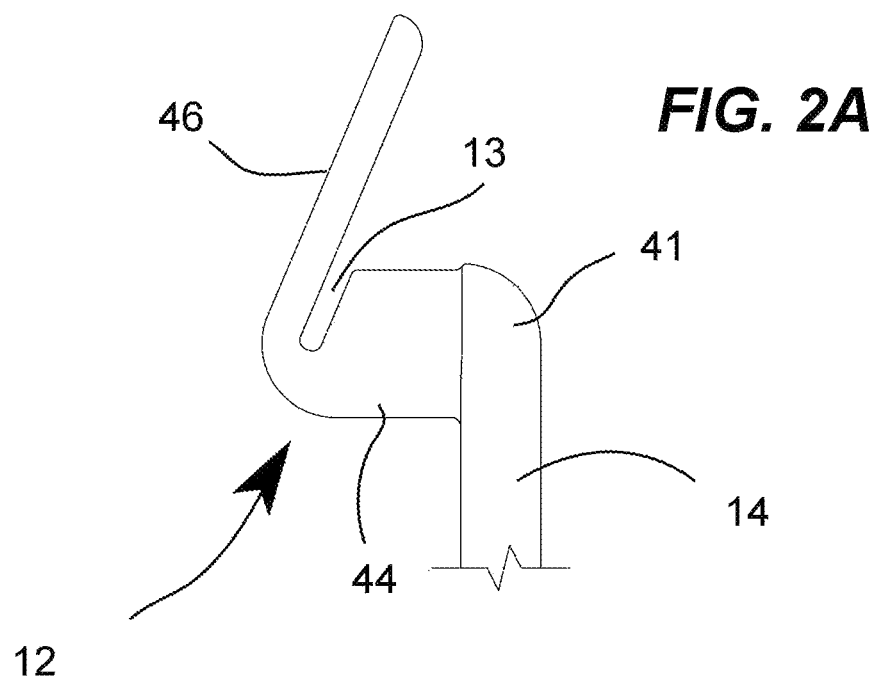
FIG. 2A is a side view of an upper anchor of the improved hook according to an embodiment of the present invention.
Figure 2B:
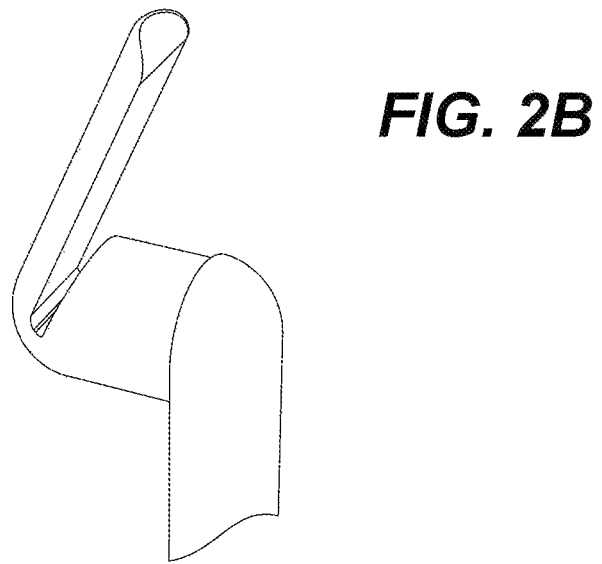
FIG. 2B is an isometric view of FIG. 2A.

FIGS. 2A-B are views of the upper anchor according to an embodiment of the present invention. Referring now to FIGS. 2A-B, upper anchor 12 is illustrated. The upper anchor is constructed of an L-shape having a horizontal member 44 and a vertical member 46. In one embodiment, the upper anchor comprises a notch 13 allowing the upper anchor to accommodate varying pegboard thicknesses. In one embodiment, the notch is between the horizontal and the vertical member. The horizontal member is attached perpendicularly to an upper portion 41 of the flat back side of the vertical central body.

Figure 3A:
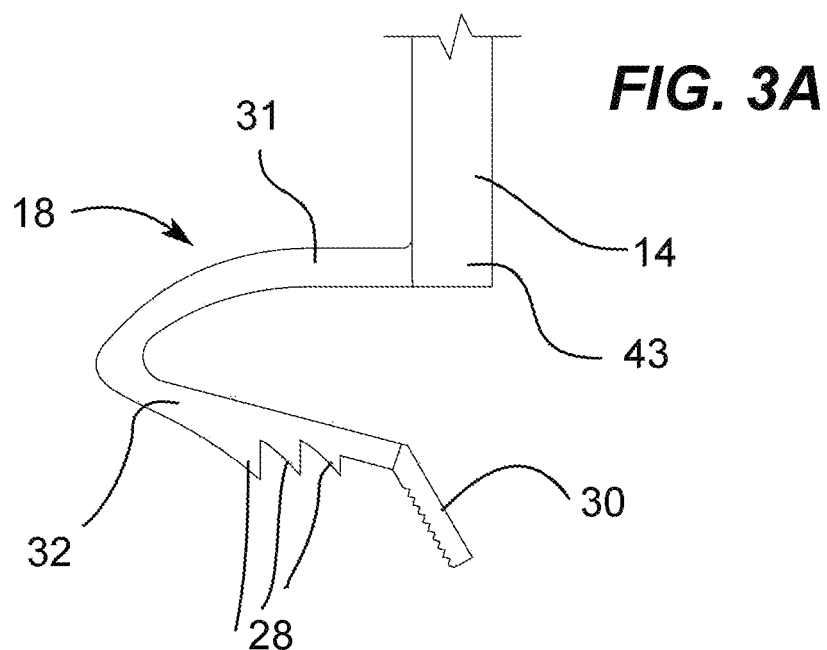
FIG. 3A is a side view of a lower anchor of the improved hook according to an embodiment of the present invention; and, FIG. 3B is an isometric view of FIG. 3A.
Figure 3B:
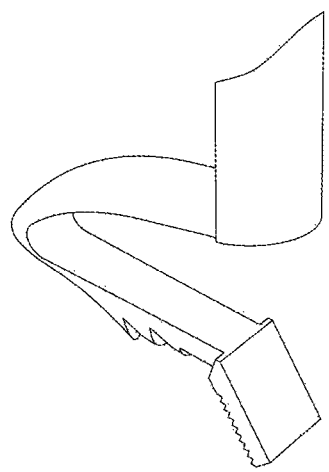

FIGS. 3A-B are views of the lower anchor according to an embodiment of the present invention. Referring now to FIGS. 3A-B, lower anchor 18 is illustrated. The lower anchor is constructed of a U-shape having a rigid member 31 and a flexible member 32. The lower anchor is attached to a lower portion 43 of the flat back side of the vertical central body. In one embodiment, the flexible member includes a plurality of teeth 28 configured to accommodate different thicknesses of pegboards. Specifically, the plurality of teeth is shaped to cling onto an edge of a pegboard hole. It is a particular advantage of the present invention, that the lower anchor is configured to prevent unintentional release of the hook during use. In one embodiment, the flexible member includes a lever 30 configured to disengage the plurality of teeth from the pegboard hole allowing the removal of the hook.

During use, the upper anchor is inserted into first hole 20 of the pegboard. Next, the lower anchor is inserted into second hole 20' until a tooth of the plurality of teeth catches the edge of the second hole, securing the lower anchor to the pegboard. The upper member of the upper anchor presses against the backside of the pegboard during use providing additional securement. The lever is accessible on the front side of the pegboard as illustrated in FIG. 1 for removal as previously described.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A hook for use with a pegboard comprising:
    a vertical central body having a flat back side, a front side, an upper portion, central portion, and a lower portion;
    a L-shaped upper anchor configured to be inserted into a first hole of the pegboard, to allow a distal end of the L-shaped upper anchor to contact a backside of the pegboard, wherein the L-shaped upper anchor is attached to the upper portion of the vertical central body;
    a U-shaped lower anchor configured to be inserted into a second hole of the pegboard, wherein the U-shaped lower anchor is attached to the lower portion of the vertical central body; and,
    a horizontal rod for hanging objects, wherein the horizontal rod is attached to the front side of vertical central body approximate to the central portion;
    the U-shaped lower anchor comprises a rigid member, a flexible member, a plurality of teeth, and a lever;
    a tooth of the plurality of teeth is configured to cling to an edge of the second hole of the pegboard;
    the lever is configured to disengage the tooth of the plurality of teeth from the second hole of the pegboard allowing the removal of the hook.

2. The hook of claim 1, wherein the flat back side is configured to be flush with the pegboard during use.

3. The hook of claim 1, further comprising a reinforcement rib positioned between a lower side of the horizontal rod and the front side of the vertical central body for support.

4. The hook of claim 1, further comprising a wing attached to each side of the vertical central body approximate to the central portion.

5. The hook of claim 1, wherein the horizontal rod includes a raised end configured to help secure a hanged object on the horizontal rod.

6. The hook of claim 1, wherein the L-shaped upper anchor consists essentially of a horizontal member, a vertical member, and a notch, wherein the notch is configured to accommodate varying pegboard thicknesses.

\* \* \* \* \*